United States Patent Office 3,525,669
Patented Aug. 25, 1970

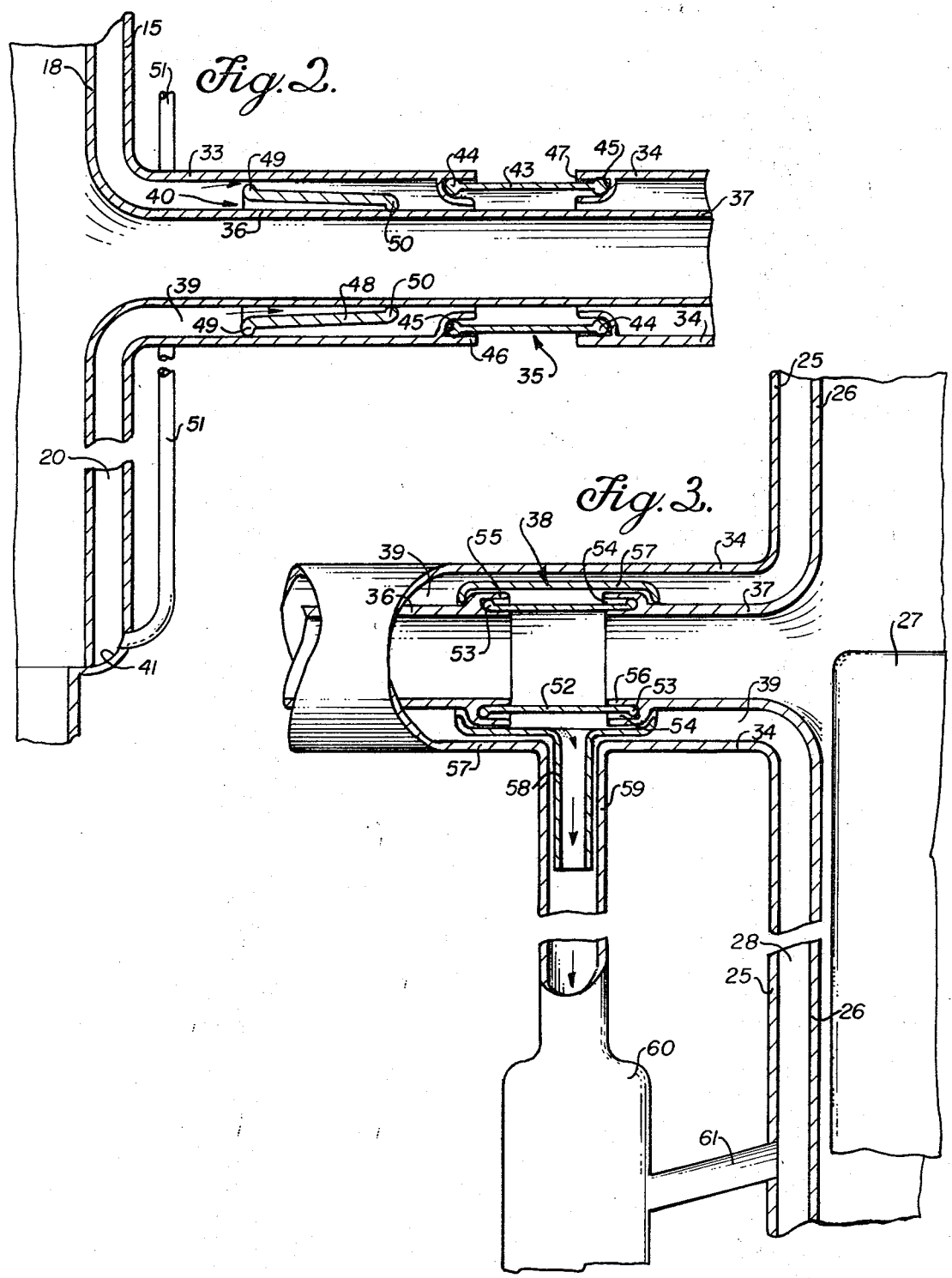

3,525,669
INSULATED DUCTS FOR NUCLEAR REACTORS
John Germer, San Jose, Calif., assignor to the United States of America as represented by the United States Atomic Energy Commission
Filed Oct. 2, 1968, Ser. No. 764,460
Int. Cl. G21c 15/02
U.S. Cl. 176—52                                       7 Claims

ABSTRACT OF THE DISCLOSURE

A means for insulating ducts in a tank type sodium reactor to reduce the structural stress caused by temperature differences and sudden temperature changes. This is accomplished by providing a gas insulation sleeve about the critical stress areas with appropriate seal rings adjacent the connector areas which allows expansion and contraction of the structure while substantially reducing structural stress thereof.

BACKGROUND OF THE INVENTION

The invention described herein was made in the course of, or under, Subcontract 31-109-38-1997 under Contract No. W-31-109-eng-38, with the United States Atomic Energy Commission.

A "tank type" sodium-cooled reactor is one in which the entire primary sodium circuit is contained within a single large vessel. This vessel contains the reactor core as a heat source, one or more intermediate heat exchangers which transfer heat to one or more secondary non-radioactive secondary sodium systems, and one or more primary circulating pumps for driving the primary sodium through the reactor and heat exchangers.

Typically, the bulk of the sodium in the vessel is at a temperature of about 800° F. Sodium from the vessel at 800° F. and about one atmosphere pressure is pressurized by the circulating pumps to a pressure of about 200 p.s.i., where it flows into the lower end or inlet of the reactor core. Nuclear fission energy causes this sodium to be rapidly heated to about 1100° F., where it leaves the top of the core and passes through ducts to the top of the intermediate heat exchangers. As it passes downward through these heat exchangers it transfers heat to the secondary sodium system and flows back into the vessel at about 800° F. In the system the flow resistance is mainly in the reactor core. Pressure drops through the ducts and the intermediate heat exchangers, in one exemplary system, are about 2 p.s.i. and 3 p.s.i., respectively. This permits an inert cover gas over the core outlet to operate at about 5 p.s.i. above the pressure of the cover gas over the main part of the vessel or about 20 p.s.i.a., and the inert cover gas above the heat exchangers to operate at about 18 p.s.i.a., in the exemplary system.

The thermal conductivity of sodium is extremely high—approximately four times as great as the stainless steel structure. For this reason it is very difficult to provide adequate insulation for the outlet sodium plenums and ducts, since their walls are exposed to a temperature differential of about 300° F. Heat transfer through the ducts in itself is not important, since all such heat transferred is maintained within the system, and at most would very slightly raise the required operating temperature of the reactor core. The much more critical problem is that of thermal stress, particularly in conditions of transient when the reactor outlet temperature can drop almost 300° F. within a few seconds if the reactor is suddenly scrammed or shut down by inserting control rods into the core.

If the walls of the reactor core outlet plenum and the sodium ducts were constructed of a single layer of stainless steel (or other metal), the extremely high heat transfer properties of sodium would cause almost the entire 300° F. gradient to take place across the steel walls. The resulting stress would be approximately 50,000 p.s.i., or somewhat over the yield point of stainless steel at 1100° F. Sudden temperature changes which can occur on the hot side often result in higher stress. Cycling of this temperature can cause warping of the components and can result in fatigue failure.

An ideal solution of the problem would be to separate the inner high temperature line from the outer structure by a gas-filled gap, as proposed in the prior art, and as exemplified by U.S. Pat. 3,108,053 to B. Vrillon et al. These prior approaches would be very straight-forward for a single plenum over the reactor core, but becomes much more difficult when allowance must be made for differential expansion of the connecting duct to the intermediate heat exchanger.

SUMMARY OF THE INVENTION

The present invention overcomes the above described problems by maintaining inert gas in a space around the plenums and ducting while providing appropriate seal rings adjacent connector area thereby substantially reducing the structural stress caused by sudden temperature changes and the accompanying thermal expansion and contraction of the structure involved.

Therefore, it is an object of this invention to provide a means for insulating ducts subject to temperature differentials.

A further object of the invention is to provide a means for substantially reducing thermal stress of a structure exposed to tempertaure differentials.

Another object of the invention is to provide means for insulating ducts in a tank type sodium-cooled nuclear reactor.

Another object of the invention is to provide means for insulating structures subject to high temperature differentials while allowing for expansion and contraction thereof.

Another object of the invention is to provide a ducting subject to differential expansion which includes sealing means for interconnecting the structural elements involved, thus reducing structural stress due to temperature differential.

Other objects of the invention will become readily apparent from the following description and accompanying drawing wherein:

BRIEF DESCRIPTION OF THE DRAWINGS

FIG. 2 is an enlarged view, partially in cross section, of a portion of the coupling area of the FIG. 1 embodiment; and FIG. 3 is enlarged view of another portion of the coupling area of the FIG. 1 embodiment and modified to include a leakage drain therefrom.

DESCRIPTION OF THE EMBODIMENT

Figure 1:
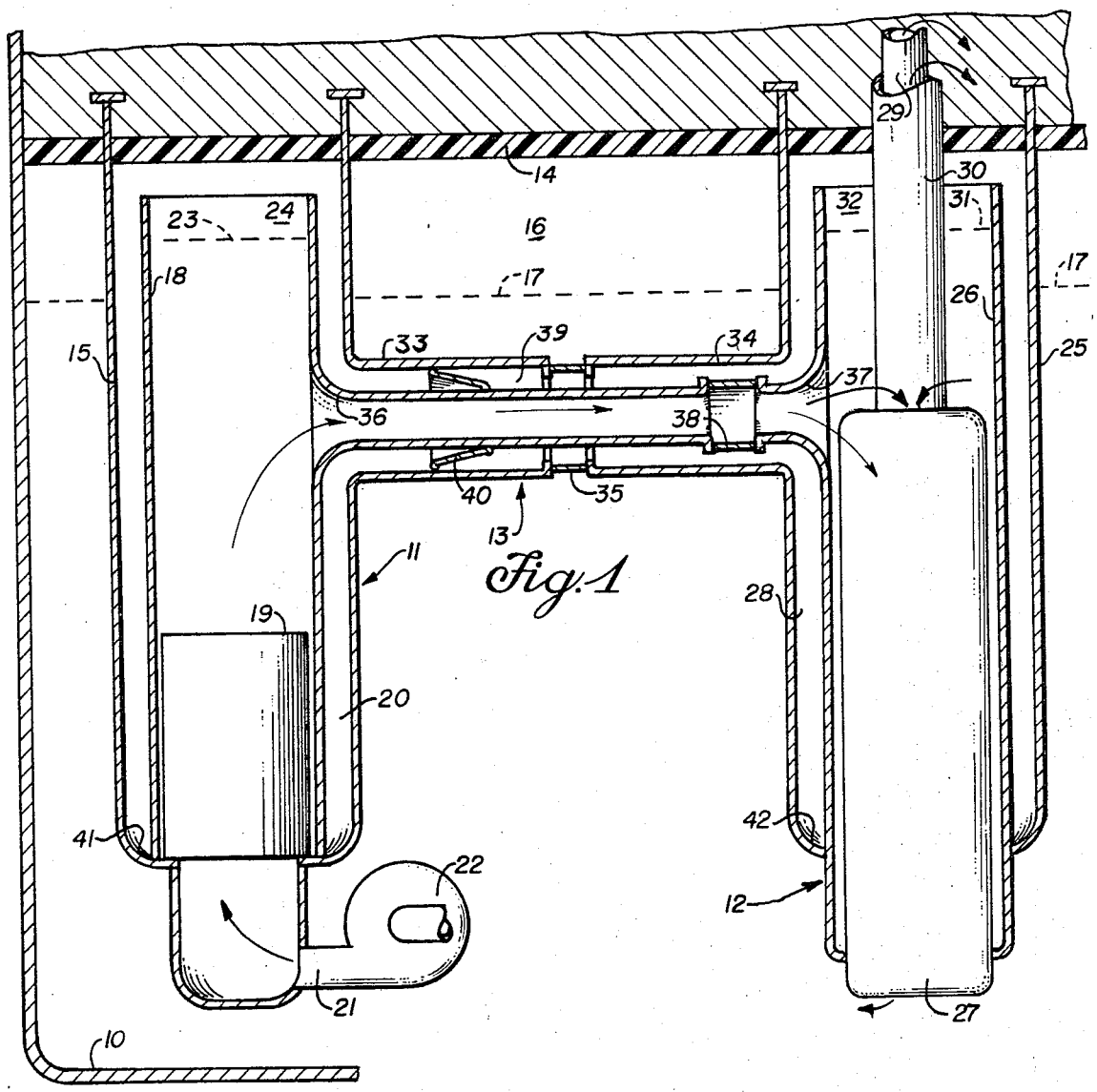
FIG. 1 is a partial view of a tank type nuclear reactor, partially in cross section, incorporating an embodiment of the invention.

The portion of the tank type reactor illustrated in FIG. 1 consists generally of a vessel 10, a reactor core section 11, a heat exchanger section 12, and a connector-duct section 13, portions of the connector-duct section 13 being integral with the reactor core and heat exchanger sections 11 and 12.

The reactor core section 11 is supported from a low temperature insulation support structure 14 through a shell 15. A temperature gradient in the shell 15 is taken in an inert (argon) cover gas region 16 between the top surface of support structure 14 at 10° F. to the liquid metal (sodium) level 17 outside of the shell 15 at 800° F. At no time is the shell 15 subjected to sudden temperature changes, thus permitting it to reach a smooth gradient by thermal conduction. Positioned within and supported by shell 15 is a liner 18 containing a reactor core 19, liner 18 being spaced from shell 15 so as to define an annulus or space 20. Connected to the bottom of liner 18 via ducting 21 is a primary sodium pump 22 which forces liquid metal (sodium) upwardly through core 19, as described in greater detail hereinafter, and maintains a liquid metal (sodium) level 23 within liner 18. The annulus or space 20 is filled with an inert (argon) gas which communicates with a cover gas above the reactor core 19 as indicated at 20 and which is at an absolute pressure of about 20 p.s.i.

The heat exchanger section 12 is supported from the low temperature insulation support structure 14 through a shell 25. Due to the open communication via the connector-duct section 13 with the reactor core section 11, a temperature gradient similar to that described above with respect to the reactor core section 11 is maintained in the heat exchanger section 12. Positioned within and supported by shell 25 is a guide shroud 26 containing an intermediate heat exchanger 27, shroud 26 being spaced from shell 25 to define an annulus or space 28. Secondary heat exhange fluid, such as sodium, is circulated through heat exchanger 27 via coaxial conduits 29 and 30, as indicated by the arrows. The primary sodium pump 22 is of sufficient capacity to maintain a sodium level 31 within guide shroud 26. Annulus 28 is also filled with an inert (argon) gas which communicates with an inert (argon) cover gas above the heat exchanger 27 as indicated at 32 and which is at an absolute pressure of about 18 p.s.i.

Each of shells 15 and 25 are provided in the side thereof with outwardly projecting sleeve-like portions or ducts 33 and 34, respectively, which form an outer duct portion of the connector-duct section 13 and are secured together by an expansion joint generally indicated at 35 and shown in detail in FIG. 2. Similarly, liner 18 and shroud 26 include outwardly projecting sleeve-like portions or ducts 36 and 37, respectively, which form an inner duct portion of the connector-duct section 13 and are secured together by an expansion joint generally indicated at 38 and shown in detail in FIG. 3. Sleeve-like portions 36 and 37 are coaxially aligned within sleeve-like portions 33 and 34 to define an annulus or space 39 which is filled with argon gas and provides fluid communication between annulus 20 of reactor-core section 11 and annulus 28 of heat exchanger section 12. A ring seal indicated at 40, shown in greater detail in FIG. 2, is positioned in annulus 39 to maintain the 2 p.s.i. difference between cover gas 24 above core 19 and cover gas 32 above heat exchanger 27. The lower end of each annulus 20 and 28 forms a sump 41 and 42, respectively, to accumulate any leakage passing through expansion joints 35 and 38, and are provided with drains as described hereinbelow with respect to FIGS. 2 and 3.

To illustrate the size of an exemplary tank type reactor problem involved, the distance between the centers of the reactor core 19 and the heat exchanger 27 is about 30 feet. The ducts (elements 33–34 and 36–37) connecting shells 15 and 25 must accommodate a thermal differential expansion of about 2½ inches when its temperature is raised from 100° F. to 800° F. In order to accommodate this expansion, bends in the duct could be provided, if it were not for the extreme size thereof (about 40 inches inside diameter). Also, note that liner 18 and shroud 26 as well as the inner ducts (elements 36 and 37) are exposed to the outlet temperature of sodium discharging from the reactor core and which is about 1100° F., while the shells 15 and 25 and the outer ducts (elements 33 and 34) are exposed to the sodium 17 which is at the reactor inlet temperature of about 800° F. In addition, the pressure drops through the connector-duct section 13 and the heat exchanger section 12 are about 2 p.s.i. and 3 p.s.i., respectively, thus the cover gas 24 over the reactor core 19 is about 5 p.s.i. above the pressure of the cover gas 16 over the main part of the vessel, which is at about 15 p.s.i. absolute.

Referring now to FIG. 2, the expansion joint 35 comprises a seal ring or sleeve 43 having an enlarged rim 44 at each end which are retained by a close clearance in slots 45 formed in the ends 46 and 47, respectively, of sleeve-like portions or ducts 33 and 34, the ends 46 and 47 being enlarged to provide the slots 45 therein. The slots 45 are of sufficient depth to provide the required expansion motion between pipe 43 and ducts 33 and 34.

Seal ring 40, as shown in FIG. 2, comprises a ring or pipe 48 having an outwardly extending flange or rim 49 and an inwardly extending flange or rim 50. Flange 49 is configured to provide a close fit against the internal surface of outer duct 3, with flange 50 forming a close fit with the outer surface of inner duct 36. It is thus seen that seal ring 40 is able to accommodate both axial and radial misalignment of ducts 33 and 36. Any argon leakage which may occur past seal ring 40, as indicated by the arrows and legends in the annulus 39 of FIG. 2, is accommodated by an external gas recirculation system, not shown, so as to provide the differential gas pressure of 2 p.s.i. thereacross.

Also, as shown in FIG. 2, the small pressure differential normally at expansion joint 35 tends to leak a small amount of argon gas outwardly from the annulus 39 to the sodium 17, as indicated by the arrows and legends. This is accommodated if sufficient recirculation capacity is built into the argon system, and if the bubbles caused thereby are not introduced into a rapidly flowing region of the sodium coolant which could cause the bubbles to be drawn into the inlet of the pump 22. However, such entrainment can be easily prevented by baffles, not shown, in the sodium 17.

If desired, draining of any sodium from the sump 41 of annulus 20 can be accomplished by running one or more small tubes 51 between the bottom of the sump and slightly above the sodium level 17 contained in vessel 10. Such a drain takes advantage of the pressure drop of the system, and normally a small leakage flow of argon would occur which would entrain and raise any liquid sodium. This method would be particularly effective at full sodium flow, but less effective when the available pressure is greatly reduced.

Referring now to FIG. 3, the expansion joint 38 and associated drainage system is illustrated in detail. The expansion joint 38 is constructed similar to joint 35 and comprises a ring seal or sleeve 52 having an enlarged rim 53 at each end thereof which are retained in slots 54 formed in enlarged ends 55 and 56, respectively, of the sleeve-like portion or ducts 36 and 37. Rims 53 are in a close clearance fit in slots 54 and slots 54 are of sufficient depth to allow for the necessary expansion of the ducts 36 and 37. Normally joint 38 has a slightly higher pressure on the sodium side (within ducts 36–37), which corresponds to the hydrostatic head between that point and the free sodium surface 31 above the heat exchanger 27. The slight amount of sodium leakage past the seal ring 52 is confined by a surrounding baffle ring 57 to prevent splashing of the high temperature leakage sodium and the thermal shock and stress created thereby on the duct 34 and which is provided with a drain tube 58. Drain tube 58 extends into a drain tube 59 connected to duct 34 and is connected to a sump 60. In addition sump 42 of annulus 28 is connected via a tube 61 to sump 60. Thus, any sodium leakage as indicated by the legend and arrows into the annulus 39 is drained into sump 60. If desired baffle ring 57 could be eliminated or drained into annulus 39, 28 and sump 42.

It has thus been shown that the present invention provides a means for insulating ducts in a tank type sodium-cooled reactor to reduce the structural stress caused by temperature differences and sudden temperature changes.

Although a specific embodiment has been illustrated and described, modifications and changes will become apparent to those skilled in the art, and it is intended to cover in the appended claims all such modifications and changes as come within the spirit and scope of the invention.

I claim:

1. In combination with a tank type liquid metal cooled nuclear reactor, means for insulating ducting to reduce the structural stress thereon caused by temperature differences and sudden temperature changes comprising: a pair of shell means suspended from a support structure so as to be at least partially immersed in liquid metal coolant contained in a vessel, liner means positioned within and supported by said one of said shell means, reactor core means operatively mounted within said liner means, at least a portion of said liner means being spaced from said one of said shell means and defining a first annulus therebetween, pump means connected to the lower end of said liner means for forcing the liquid metal coolant upwardly through said reactor core means, first duct means operatively connected to said one of said shell means, second duct means operatively connected to said liner means and coaxially located within said first duct means and defining a space therebetween, shroud means positioned within and supported by the other of said shell means, heat exchanger means operatively mounted within said shroud means, at least a portion of said shroud means being spaced from said other of said shell means and defining a second annulus therebetween, third duct means operatively connected to said other of said shell means fourth duct means operatively connected to said shroud means and coaxially located within said third duct means and defining a space therebetween, first expansion joint means interconnecting said first and third duct means and defining an outer duct assembly, said first and third duct means being submerged in liquid metal coolant, second expansion joint means interconnecting said second and fourth duct means, and defining an inner duct assembly, ring seal means located in said space formed between said inner and outer duct assemblies, said first annulus and said second annulus being in open communication through said space defined between said duct assemblies, each of said first and second annulus and said space containing an inert gas under pressure, each of said liner means and said shroud means being open at the upper end thereof and in fluid communication with the associated annulus, said seal ring functioning to maintain the inert gas at the upper end of said shroud means at a lower pressure than the pressure at the upper end of said liner means.

2. The combination defined in claim 1, wherein each of said first and second expansion joint means is composed of a ring-like member having an enlarged rim portion at each end thereof, each of said duct means terminating in an elongated slot, said rim portions of said ring-like member being located in a close clearance within said elongated slots of the associated duct means whereby said rim portions move within said slots upon expansion and contraction of said inner and outer duct assemblies.

3. The combination defined in claim 1, wherein said ring seal means consists of a ring-like member having an outwardly projecting flange portion and an inwardly projecting flange portion, said outwardly projecting flange portion being in a close clearance fit with respect to said outer duct assembly, and said inwardly projecting flange portion being in a close clearance fit with respect to said inner duct assembly.

4. The combination defined in claim 1, additionally including a baffle-ring assembly positioned about one of said expansion joint means, said baffle-ring assembly being provided with a drain tube means through which any leakage of the liquid metal coolant from within said inner duct assembly is directed to a sump therefor.

5. The combination defined in claim 4, wherein said sump is connected to said outer duct assembly by a drain conduit means, and wherein said drain tube means of said baffle-ring assembly drains into said drain conduit means.

6. The combination defined in claim 1, wherein each of said first and second annulus is provided with a drain means at the lower end thereof.

7. The combination defined in claim 1, wherein said liquid metal coolant is sodium, and wherein said inert gas is argon gas.

References Cited

UNITED STATES PATENTS

| | | | |
|---|---|---|---|
| 3,079,321 | 2/1963 | Oppenheimer et al. | 176—52 |
| 3,108,053 | 10/1963 | Vrillon et al. | 176—58 X |
| 3,428,522 | 2/1969 | Muller | 176—52 X |

CARL D. QUARFORTH, Primary Examiner

H. E. BEHREND, Assistant Examiner

U.S. Cl. X.R.

176—63, 87